Figure 1:
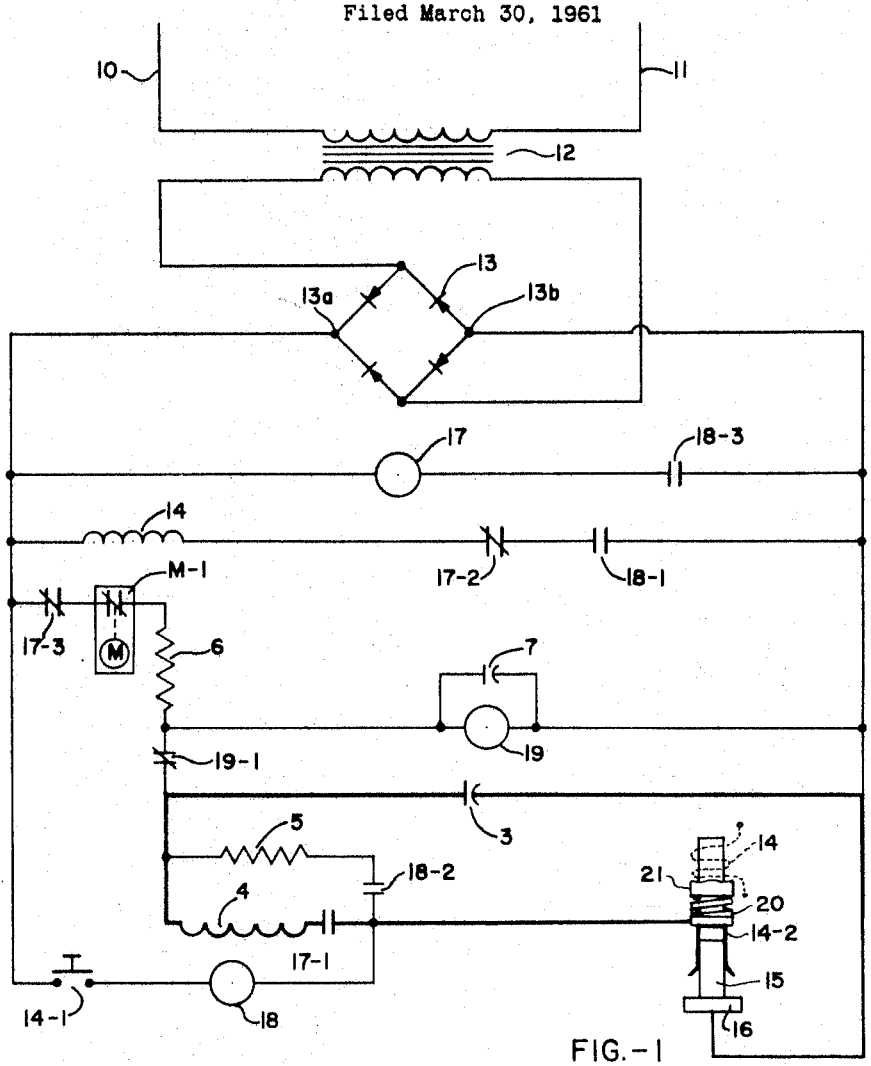

June 9, 1964 P. A. GLORIOSO 3,136,880
CONDENSER DISCHARGE STUD WELDING APPARATUS
Filed March 30, 1961

INVENTOR.
PAUL A. GLORIOSO

United States Patent Office 3,136,880
Patented June 9, 1964

3,136,880
CONDENSER DISCHARGE STUD WELDING APPARATUS
Paul A. Glorioso, Lorain, Ohio, assignor to Gregory Industries, Inc.
Filed Mar. 30, 1961, Ser. No. 99,550
15 Claims. (Cl. 219—98)

This invention relates in general to the art of end welding of weld studs, and relates more specifically to the arts of drawn arc welding and condenser discharge stud welding.

A principal object of this invention is to provide an improved condenser discharge power source for stud welding.

A more specific object of this invention is to provide a condenser discharge power source for drawn arc stud welding. The drawn arc method of end welding studs provides a device which will hold a stud against the workpiece in the position where it is to be welded, and then will lift that stud from the work while a low value current flows to draw a pilot arc. Thereafter, in conventional practice, the arc is increased in value to establish a higher powered welding arc in order to melt some of the stud and base metal surface. Thereafter the stud is plunged into the position where it is to be welded and the molten metal of the stud and base metal is allowed to cool. Thus, a weld is established.

In the welding of larger size studs to heavy base metal, a continuous source of power delivering considerable heat is acceptable because the excess heat can be dissipated without doing damage to either the stud or the base to which it is attached. However, in the welding of studs to very thin base metal, an excessive amount of heat will cause the arc to burn through the base metal. Hence, it is not practical to use the conventional drawn arc stud welding technique employing continuous power. For such welding, it has become acceptable practice to use a condenser discharge in order to create a sufficient amount of welding energy but to do it in a very short period of time. This combination will cause only a surface melting of the thin metal to which the stud is to be attached.

Discharge of a condenser without some means of control is characteristically substantially instantaneous. A chart of such discharge will indicate a rapid rise to an extreme peak and an immediate collapse to zero. Hence, condenser discharge heretofore has been impractical for the drawn arc stud welding technique.

A stud welding gun which causes the stud to lift from the touch position to draw an arc, followed by an establishment of a welding arc and then a plunge to the weld position, has of necessity some variation in timing. If such a welding gun is powered by a condenser discharge, it becomes very critical to coordinate the peak of the condenser discharge and the stud position with relationship to the work. Such coordination has heretofore been virtually impossible because of the rapid condenser discharge.

It is well-known that a resistance in series with a condenser will spread the total energy out across a longer period of time. Unfortunately, it is also well-known, any resistance sufficiently great to extend the condenser discharge time will also lower the intensity of the discharge to the point where the heat intensity is not sufficient to weld. Also, the best efforts to extend the time of discharge usefulness by resistance means will not give the amount of time that may be employed in conventional stud welding to heavy plate. It will be seen as invention proceeds, that the invention will provide a sufficient spread of the time of discharge, with sufficient heat intensity, and with a very effective coordination of that intensity with the stud plunge in order to use the entire working period of time to the fullest advantage.

Accordingly, it is a principal object of this invention to modify a condenser discharge power source in order to establish and maintain the current discharge for a longer period of time to coordinate and relate the current discharge to the mechanical movement of a stud welding gun in order to reduce the critical nature of the timing of the discharge and enable the creation of the weld metal over a period of time sufficient to permit the lifting of the stud and return of the stud to the workpiece base.

The basic concept and, hence, the principal object of this invention, is to develop a condenser discharge peak wave form high enough to produce a weld but extended enough to permit a mechanical movement of a stud by a weld gun to lift position and causing the bulk of weld heat generation during the period of time required to return the stud to its weld position and contact with the base to which it is to be welded.

Another and more specific object of this invention is to achieve this extension of the peak by means of circuitry which modifies the discharge without consuming appreciable amounts of the electrical energy.

Another object of this invention is to provide a circuitry to maintain a potential on the capacitance which will be within specified limits regardless of supply line voltage.

Figure 2:
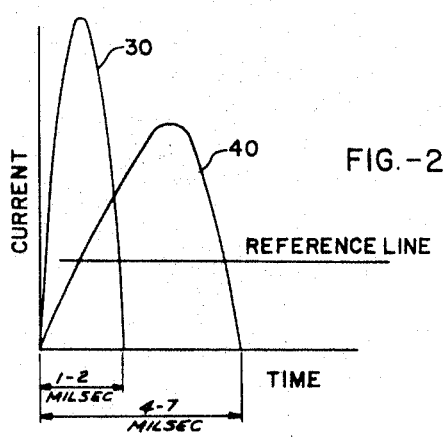

Other objects and a fuller understanding of the invention may be had by referring to the following description and claims taken in conjunction with the accompanying drawings in which:

FIGURE 1 is a wiring diagram in schematic form of a complete system in preferred form; and, FIGURE 2 is a graph illustrating an uncontrolled condenser discharge wave form in comparison with the wave form created by the circuitry of this invention.

For the purpose of illustrating and describing the invention, reference is made to FIGURES 1 and 2 in which the reference numbers will be used to describe and define the pictured symbols.

In the schematic illustration of FIGURE 1, the source of power is obtained from power lines 10 and 11.

A normal power lighting circuit of 110 volts will not vary greatly when the circuit is established near regularly operating consumer outlets, but whenever temporary lines are extended over great distances, such as in new construction sites, it often happens that the voltage drops below the recommended operating voltage level. This invention takes into account the fact that such drops can be expected from time to time and makes possible the full and proper operation of a stud welding apparatus at considerably reduced voltage levels.

A transformer, indicated generally by the reference character 12 is employed to increase the voltage considerably above the incoming voltage. The increase in voltage is designed to be greater at all times than required by the operating welding circuit even though the incoming voltage may be down to the lowest known or expected level.

The incoming voltage must be alternating and, therefore, a rectifier 13 is employed to rectify the alternating voltage into a direct voltage.

The positive terminal of the rectifier 13 will be referred to sometimes as the first terminal 13A. This designation is not necessarily carried over into claim definitions of this invention. Similarly, the negative terminal of the rectifier may be referred to as a second terminal 13B.

Stud welding guns are now old and well-known in general operating principles and the actual physical structure employed for holding a stud, lifting that stud from a workpiece base, and returning the stud back to that base is illustrated schematically in FIGURE 1. A portion of a gun housing is indicated by the reference character 21. The gun is further provided with a solenoid coil, indicated by the reference character 14 in the drawing, and this coil operates a chuck on a solenoid principle. The chuck in turn is designed to hold a welding stud or fastener. In the circuit of FIGURE 1, the solenoid operated chuck is indicated by the reference character 14-2 and a stud 15 is shown frictionally engaged in that chuck 14-2. A return spring 20 is interposed between the chuck 14-2 and the gun housing 21 to outwardly bias the stud and to cause it to return to the workpiece when the solenoid coil 14 is de-energized. The base, sometimes referred to as the work, to which the stud is to be welded is represented schematically by the bar 16.

The source of current for welding the stud is obtained from a capacitor 3. A discharge circuit path is provided from the capacitor 3, through an inductance 4, a contactor contact 17-1, stud 15, pilot arc established between the stud and workpiece 16, and back to the capacitor 3.

The illustrated embodiment for controlling the drawing of the pilot arc, and establishment of the full current discharge is a high resistance solenoid relay 18. The relay 18 operates normally open contacts 18-1, 18-2 and 18-3 and in turn contactor solenoid 17. Contactor solenoid 17 is in operative control of normally open contact 17-1 and auxiliary normally closed contacts 17-2 and 17-3.

The first rectifier terminal 13A is connected to an initiation gun control button 14-1 of the weld gun and the gun button 14-1 is then connected to the chuck 14-2 through a high resistance solenoid operated control relay 18. Hence, if the operator should depress the button 14-1 while holding the chuck 14-2, the resistance of the relay 18 will be sufficiently high that no harmful current will pass through the body of the operator. Furthermore, by this arrangement, no current can flow through the control relay 18 unless a stud is placed in the chuck 14-2 and placed against the work 16 to complete a circuit through the relay and to the second terminal.

When properly fitted with a stud 15 and placed against a grounded workpiece 16 and the button 14-1 depressed, the relay 18 will be energized. When energized, the solenoid operates the contact 18-1.

Operation of contact 18-1 will complete a circuit, from the first rectifier terminal 13A through the gun solenoid coil 14 normally closed contact 17-2, contact 18-1 and back to the second rectifier terminal 13B which energizes the gun coil 14. Such energization of the coil 14 will cause the gun to retract and separate the stud 15 from the work 16.

As the stud 15 is retracted, it is desired to establish a low value pilot arc which will not melt the workpiece but will be a pilot upon which a higher value welding current can be imposed. The circuitry which establishes a pilot arc begins with the capacitor 3. There is a resistor 5 in series with contact 18-2 shunting the contact 17-1. Whenever the gun button 14-1 is depressed and the relay coil 18 is energized, contact 18-2 will close and will establish the pilot arc circuit. Accordingly, as the stud is lifted from the workpiece, the current flowing from the capacitor 3 through the resistor 5, contact 18-2 and stud 15 to the workpiece 16 and back to the capacitor will establish a pilot arc of low intensity.

Whenever the relay coil 18 energizes causing the pilot arc to be established by closing contact 18-2 it also causes the gun coil to operate by closing the contact 18-1 and it also closes the contact 18-3 in a circuit comprised of the first terminal 13A, the contactor solenoid coil 17, the contact 18-3 and the second terminal 13B. Closing of contact 18-3 thus causes the contactor coil 17 to be energized, which in turn closes the main welding contact 17-1. Closing of contact 17-1 establishes a full weld current from the capacitor 3 through inductance 4, the stud 15 and across the established gap upon the prior established arc.

However, the discharge is not instantaneous in a high peak, but rather the discharge is retarded and extended over a longer period of time. Refer to FIGURE 2 of the drawing. Here will be seen a curve 30 of a conventional discharge from a condenser. It will be seen from this curve 30 that the intensity of the discharge is extremely high and rapidly decays. By contrast, curve 40 illustrates the effect upon the same discharge when inductance 4 is connected in series with the capacitor 3. It will be seen that the current rise and decay is much slower. The peak is also much lower. It will be seen from FIGURE 2 that the useful area, under the curve, is much greater in time, and because anything above the current level indicated by the reference line is sufficient to produce a weld, it will be seen that a weld current of useful intensity passes through the gap area between the stud and workpiece for an extended period of time. This is the key to the successful operation of the present invention and eliminates the need for mechanically establishing an arc by tips on studs.

Prior capacitive powered devices have employed mechanically formed fuse tips on studs in order to establish an arc and to permit movement of stud to the workpiece while the high peak condenser discharge takes place. In such prior devices it has been recommended that the lead lines to the welding gun from the condenser be placed upon the floor in a manner to avoid any coils or stacks of wire which might be inductive. In the present invention, retarding produced by coiled lines is an aid to the retarding produced by the inductance 4. Inductance 4 establishes a minimum retarding of current and any incidental retarding in the line equipment is generally beneficial.

After the stud has lifted and drawn a pilot arc, and thereafter having established the welding current, it is essential that the stud be returned to the workpiece while the welding arc is intense enough to maintain molten metal. Generally, this will means that the stud will be required to be returned to the workpiece while the curve in FIGURE 2 is above the reference line.

Physically, this rapid return of the stud during this operative period of arc play is caused by opening the normally closed switch 17-2 as a result of energizing of the contactor 17. As a practical commercial structure, the contact 17-2 has been established as a physical part of the weld contactor 17. Thus, contacts 18-1 and 18-2 close together causing coil 14 to energize and lift the stud at the same time energizing coil 17 which in turn opens contact 17-2 and ends the lifting power of coil 14. The coil will be operative, however, because the contactor 17 is large and massive and, therefore, has a tendency to move slowly. Contact 17-2 will be opened as the contact 17-1 is closed but there is a time delay. The result is a very effective timed coordination between stud plunge and condenser discharge. The discharge can take place only as the coil 14 is being rendered ineffective. Hence the design of coil 14 and the adjustment of the contact 17-2, physically, with respect to contactor 17-1, gives the design engineer the increased leeway needed to cause a proper lift, followed by discharge and plunge while welding current is available.

After a weld is completed the capacitor 3 will be completely discharged and, therefore, it becomes essential to recharge the capacitor for the next weld.

Recharging is carried out by means of a charging circuit supplied with current from the transformer 12 and rectifier 13. The circuitry required connects the terminal 13A to the capacitor 3, and includes a normally closed contact 17-3, a normally closed contact M-1. Contact M-1 is operated to open momentarily at regular intervals. Some timing device is provided to cause such opening. Preferably, this will be an electrically driven motor device in order to operate when the apparatus is supplied with the operating current from the supply line. A drive device is represented by symbol "M." A current limiting resistance 6 and a normally closed contact 19-1 complete the circuit from the first rectifier terminal 13A to the capacitor 3.

The charging circuit is completed by connecting the opposite capacitor terminal directly to the second rectifier terminal 13B.

Voltage applied to the capacitor 3 is controlled by a voltage regulating device, preferably a voltage sensitive relay having an operating solenoid coil 19 in operative control of normally closed contacts 19-1. The voltage sensitive relay 19 is effectively connected across and in parallel with the terminals of the capacitor 3 through contacts 19-1. Therefore, by preselecting the sensitivity level of the relay 19, the level of charge on the capacitor 3 at which the relay 19 operates may be preselected. Hence, the contact 19-1 may be opened at a preselected voltage level upon the capacitor 3 established by the relay 19 and thus isolate the capacitor 3 from the charging current and the voltage sensing relay 19.

A condenser 7 in parallel with the voltage sensitive relay coil 19 is provided in order to prevent rapid chatter of the relay 19 as those familiar with electrical circuitry will appreciate.

During the charging cycle, when the capacitor 3 is brought to full charge, the voltage sensing relay coil 19 will open the contact 19-1 and, therefore, isolate the condenser 3 from the charging circuit, as before explained. If the condenser is not discharged by use, it may possibly lose some of its charge. This is especially true as the capacitor ages. After the relay 19 has opened the contact 19-1, it will be seen that this relay 19 is effectively connected across the first and second terminals 13A and 13B, and hence is subject to virtually the full output voltage of the rectifier 13. Hence, the capacitor could leak away to zero charge and the relay 19 would not be able to sense this lowering of voltage. For this reason the charging circuit is intermittently interrupted by the timed contacts M-1 and when interrupted, the relay 19 is subjected at once to the voltage across the terminals of the capacitor 3 by the reclosing of contacts 19-1. If the voltage across the terminals of the capacitor 3 is below the specified level, relay 19 will permit the contact 19-1 to remain closed. Upon cycling of the timed contacts M-1 to close the circuit the rectifier 13 may then apply extra charge to the capacitor 3 until contacts 19-1 are once again opened by the relay 19 sensing a fully charged condition.

The contact 17-3 in the charging circuit, is opened when the contactor 17 closes. Opening of this contact 17-3 will prevent a short circuit current from the rectifier to the stud and workpiece through the charging circuit. Furthermore, opening of contact 17-3 will remove the voltage sensitive relay 19 from the line voltage and allow closing of the contact 19-1 in order that recharging of the capacitor may be carried forth after the welding cycle discharges the capacitor. If the relay 19 were not thus disconnected, it would stay fully responsive to the source voltage and hold the contacts 19-1 open until the timed contacts M-1 would break the circuit. This generally would be too slow. Thus, the charging condition is established immediately upon discharge.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed:

1. A stud welding device, comprising, a stud holding and retracting mechanism adapted to sequentially position a stud against a surface to which it is to be welded, to thereafter retract the stud to produce a predetermined gap, and finally to return the stud to the weld position, a pilot arc circuit for connecting in series a stud held by said mechanism with said surface, said circuit adapted to provide a low current which will produce a pilot arc across said gap as the stud is retracted, a series inductive capacitive circuit including a capacitor connected in series with an inductance, and control means adapted to discharge said inductive capacitive circuit through said gap upon said pilot arc and in timed relationship with said retracting, holding and return mechanism movement.

2. In said device and circuitry of claim 1, said control means allowing said discharge to take place during separation of the stud from the surface, said discharge providing a current to produce an arc of welding intensity and said current continuing to completion after return of the stud to said weld position.

3. A capacitor discharge stud welding apparatus comprising, a capacitor, a first circuit means connecting said capacitor to a power source for charging said capacitor, a stud holding and retracting mechanism adapted to sequentially position a stud against a workpiece, to thereafter retract the stud to produce a predetermined gap and finally, to return the stud to the weld position, a pilot arc discharge circuit connecting said capacitor with said stud and said workpiece to establish a pilot arc between said stud and said workpiece when said stud is retracted to produce said predetermined gap, an inductive discharge circuit connecting said capacitor with said stud and said workpiece to establish an arc of welding intensity between said stud and said workpiece, and said inductive discharge circuit maintaining said arc of welding intensity until return of said stud to said weld position.

4. An energy discharge stud welding apparatus comprising a stud holding and retracting mechanism adapted to sequentially position a stud against a workpiece, to thereafter retract the stud to produce a predetermined gap, and finally, to return the stud to the weld position, in capacitive energy storage and discharge means, a first energy discharge circuit connecting said stud and said workpiece with said energy storage and discharge means and restricting the energy discharge of said energy storage and discharge means to establish a pilot arc between said stud and said workpiece when said stud is retracted from said workpiece, a second energy discharge circuit upon establishment of said pilot arc connecting said energy storage and discharge means with said stud and said workpiece to establish an arc of welding intensity and to sustain said energy discharge until said stud is returned to said weld position.

5. In the combination of claim 4, an energy charge sensitive means maintaining a predetermined energy level in said energy storage and discharge means.

6. In the combination of claim 3, a voltage sensitive means connected to said capacitor and to a power source for charging and maintaining a predetermined charge on said capacitor prior to its discharge, said voltage sensitive means disconnecting the capacitor from the power source when said predetermined charge is attained and thereafter periodically reconnecting the capacitor to maintain said predetermined charge.

7. A capacitor discharge stud welding apparatus comprising:
 (a) a capacitor;
 (b) a first circuit means for connecting said capacitor to a power source for charging said capacitor;
 (c) a stud holding and retracting mechanism to sequentially position a stud against a workpiece, to thereafter retract the stud to produce a predetermined gap, and finally to return the stud to the weld position;
 (d) a pilot arc discharge circuit connecting said capacitor in circuit with said stud and said workpiece to establish a pilot arc between said stud and said workpiece when said stud is retracted to produce said predetermined gap;
 (e) a welding arc discharge circuit upon establishment of said pilot arc connecting said capacitor in circuit with said stud and said workpiece to establish an arc of welding intensity between said stud and said workpiece, and, (f) said welding arc discharge circuit maintaining said arc of welding intensity until return of said stud to said weld position.

8. A capacitor discharge stud welding apparatus comprising:

(a) a capacitor having first and second terminals;

(b) a direct current power source having first and second terminals, a first circuit connecting said first terminals, a second circuit connecting said second terminals;

(c) a voltage sensing control connected across the first and second capacitor terminals;

(d) a normally closed contact located in one of said circuits to isolate the capacitor from the power source and from the voltage sensing control when the contact is open, said voltage sensing control being in operative control of said contact and adapted to open said contact upon the voltage across said capacitor terminals reaching a predetermined value;

(e) a voltage dropping resistor in said first circuit between said voltage source and said voltage sensing control, said voltage dropping resistor limiting the initial inrush of current to the capacitor when the capacitor is fully discharged but having no material effect on the circuit after the capacitor is fully charged and the contact opened;

(f) a stud holding and retracting mechanism adapted to sequentially position a stud against a workpiece to which it is to be welded, to thereafter retract the stud to produce a predetermined gap, and finally to return the stud to the weld position;

(g) a third circuit connecting the first and second terminals of said capacitor in series circuit with said stud and said workpiece to produce a pilot arc across said gap as the stud is retracted;

(h) an inductance, a fourth circuit connecting said first and second capacitor terminals in series circuit with said inductance, said stud and said workpiece; and, (i) control means operative after establishment of said pilot arc to discharge the series inductance-capacitor circuit through said gap to establish an arc across said gap, and said series inductance-capacitor circuit increasing the discharge time period of the capacitor.

9. In a welding apparatus comprising a mechanism adapted to sequentially position a stud in electrical contact with a workpiece to which the stud is to be welded, to retract the stud a predetermined distance from the workpiece, to establish an electric arc between the workpiece and the stud and to return the stud to a weld position on the workpiece, capacitor means adapted to supply current to the established arc for welding the stud to the workpiece, an impedance means, circuit means for connecting said impedance means in series with the stud, the workpiece and said capacitor means for discharging said capacitor means through the stud and workpiece during the return of the stud to the workpiece, said impedance means delaying the rise of discharge current and prolonging the decay of discharge current such that a current of welding intensity is maintained in the established arc until the stud is returned to the workpiece.

10. In welding apparatus having a holding and retracting mechanism adapted to sequentially position a stud to be welded in electrical contact with a workpiece, to retract the stud a predetermined distance from the workpiece and to return the stud to a weld position on the workpiece, the combination therewith of capacitor means to supply welding current for welding the stud to the workpiece, first impedance means, first circuit means for connecting said first impedance means in series with the stud, the workpiece and said capacitor means while the stud is in contact with and then retracted from the workpiece for initiating discharge of said capacitor means through the stud and workpiece and for establishing a pilot arc between them, said first impedance means limiting discharge of said capacitor means such that the pilot arc current is of less than welding intensity, second impedance means, second circuit means for connecting said second impedance means in series with the stud, the workpiece and said capacitor means during the return of the stud to the workpiece, said second impedance means having a value less than that of said first impedance means such that a current of welding intensity is obtained during the return of the stud to the workpiece, said first and second impedance means correlating discharge of said capacitor means with retraction and return time of the holding and retracting mechanism to provide a predetermined delay in the rise of capacitor discharge current and a predetermined prolonged decay of capacitor discharge current to effect the aforesaid pilot arc current and welding current relationship.

11. The combination set forth in claim 10 wherein said second impedance means comprises an inductance.

12. A capacitor discharge welding apparatus comprising a movable chuck for holding a stud against a workpiece to which the stud is to be welded, means including an electro-magnetic coil energizable for retracting the chuck to produce a predetermined arcing gap between the stud and the workpiece and biasing means effective upon de-energization of said coil to move said chuck to thereby return the stud to a weld position on the workpiece, a capacitor, circuit means for connecting said capacitor to a power source for charging said capacitor, pilot arc circuit means including a relatively high impedance for connecting said capacitor in series with the stud and the workpiece to establish a pilot arc of less than welding intensity between the part and the workpiece when the stud is retracted to produce said arcing gap, welding arc circuit means including a relatively low impedance for connecting said capacitor in series with the stud and workpiece to establish an arc of welding intensity between the stud and workpiece substantially simultaneously with the de-energization of said coil, said low impedance providing sufficient inductive reactance to the discharge of said capacitor for maintaining said arc at welding intensity substantially until return of the stud to the weld position.

13. In a welding apparatus having a reciprocable stud holding mechanism with means for biasing said mechanism in one direction for moving a stud into contact with a workpiece and means for biasing said mechanism in the opposite direction for retracting the stud a predetermined distance from the workpiece to draw an arc between the stud and the workpiece, the combination therewith of a capacitive stored energy power supply, charging circuit means adapted to be connected across said power supply to maintain a predetermined charge on said power supply prior to discharge thereof for welding purposes, an inductance, and welding arc circuit means for connecting said power supply, the inductance, the stud and the workpiece in series in timed relation with the movement of said mechanism such that said power supply is discharged to supply the drawn arc with current of welding intensity between the stud and the workpiece while the stud is retracted said predetermined distance, the circuit combination of said power supply and said inductance limiting the peak value of the discharge current to prevent the stud from burning through said workpiece and increasing the discharge time period of said power supply such that said arc of welding intensity is substantially co-extensive in duration with the return of the stud to the workpiece to thereby assure a proper weld of the stud to the workpiece.

14. The combination set forth in claim 13 wherein said means for retracting the stud includes a solenoid and means for energizing said solenoid, and wherein said welding arc circuit means includes a contactor mechanism comprising first contact means and second contact means and means for actuating said first and second contact means simultaneously, said first contact means when closed effecting connection of said inductance, stud and workpiece with said power supply to initiate said current of welding intensity between the stud and the workpiece, said second contact means being adjusted relative to said first contact means to disconnect said solenoid from said energizing means just prior to said first contact means effecting said connection so that the current of welding intensity is initiated as said solenoid is being de-energized and as the first-mentioned biasing means initiates movement of the stud towards the workpiece.

15. The combination set forth in claim 4 wherein said stud holding and retracting mechanism includes a solenoid and means for energizing said solenoid, and wherein said second energy discharge circuit includes a contactor mechanism comprising first contact means and second contact means and means for actuating said first and second contact means simultaneously, said first contact means when closed effecting connection of said energy storage and discharge means with said stud and said workpiece to establish the arc of welding intensity, said second contact means being adjusted relative to said first contact means to disconnect said solenoid from said energizing means just prior to said first contact means effecting said connection so that the arc of welding intensity is initiated as said solenoid is being deenergized and as said stud holding and retracting mechanism initiates return movement of the stud towards the workpiece.

References Cited in the file of this patent

UNITED STATES PATENTS

| | | |
|---|---|---|
| 2,250,102 | Klemperer | July 22, 1941 |
| 2,342,144 | Hughes | Feb. 22, 1944 |
| 2,353,733 | Klemperer | July 18, 1944 |
| 2,610,278 | Graham | Sept. 9, 1952 |
| 2,845,523 | Ramson | July 29, 1958 |

UNITED STATES PATENT OFFICE
CERTIFICATE OF CORRECTION

Patent No. 3,136,880            June 9, 1964

Paul A. Glorioso

It is hereby certified that error appears in the above numbered patent requiring correction and that the said Letters Patent should read as corrected below.

Column 6, line 36, for "in" read -- a --; column 8, line 14, after "with" insert -- the --.

Signed and sealed this 27th day of October 1964.

(SEAL)
Attest:

ERNEST W. SWIDER
Attesting Officer

EDWARD J. BRENNER
Commissioner of Patents